United States Patent
Wessel et al.

(10) Patent No.: US 8,817,407 B2
(45) Date of Patent: Aug. 26, 2014

(54) HEAT ASSISTED MAGNETIC RECORDING HEAD

(71) Applicant: Seagate Technology LLC, Cupertino, CA (US)

(72) Inventors: James G. Wessel, Savage, MN (US); Steven C. Riemer, Minneapolis, MN (US); Zoran Jandric, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/798,463

(22) Filed: Mar. 13, 2013

(65) Prior Publication Data

US 2013/0286806 A1  Oct. 31, 2013

Related U.S. Application Data

(60) Provisional application No. 61/638,984, filed on Apr. 26, 2012.

(51) Int. Cl.
*G11B 5/02* (2006.01)
*G11B 13/08* (2006.01)
*G11B 5/31* (2006.01)
*G11B 5/00* (2006.01)

(52) U.S. Cl.
CPC ........ *G11B 13/08* (2013.01); *G11B 2005/0021* (2013.01); *G11B 5/3136* (2013.01); *G11B 5/314* (2013.01)
USPC ...... 360/59; 360/320; 360/125.32; 369/13.33

(58) Field of Classification Search
None
See application file for complete search history.

(56) References Cited

U.S. PATENT DOCUMENTS

2013/0286804 A1* 10/2013 Zhao et al. .................. 369/13.33

\* cited by examiner

*Primary Examiner* — Wayne Young
*Assistant Examiner* — Brian Butcher
(74) *Attorney, Agent, or Firm* — Mueting, Raasch & Gebhardt P.A.

(57) ABSTRACT

An apparatus that includes a write pole, the write pole including a magnetic material; a near field transducer-heat sink (NFT-HS), the NFT-HS including a noble metal; and a power source configured to electrically bias the write pole with respect to a second structure.

14 Claims, 5 Drawing Sheets

HEAT ASSISTED MAGNETIC RECORDING HEAD

PRIORITY

This application claims priority to U.S. Provisional Application No. 61/638,984 entitled "REDUCTION OF GALVANIC CORROSION VIA IMPRESSED CURRENTS" having docket number STL17267.01 filed on Apr. 26, 2012, the disclosure of which is incorporated herein by reference thereto.

BACKGROUND

Heat assisted magnetic recording (HAMR) is a possible avenue for increasing the areal density of magnetic recording. As such, advances in HAMR are ongoing.

SUMMARY

Disclosed herein is an apparatus that includes a write pole, the write pole including a magnetic material; a near field transducer-heat sink (NFT-HS), the NFT-HS including a noble metal; and a power source configured to electrically bias the write pole with respect to a second structure.

Also disclosed is an apparatus that includes a write pole, the write pole including a magnetic material; a near field transducer-heat sink (NFT-HS), the NFT-HS including a noble metal; an electrical isolation layer, the electrical isolation layer positioned between the write pole and the NFT-HS, the electrical isolation layer configured to electrically isolate the write pole from the NFT-HS; and a power source configured to electrically bias the write pole with respect to the NFT-HS.

Also disclosed is a method of reducing galvanic corrosion of a heat assisted magnetic recording (HAMR) head, the HAMR head including a write pole, and a near field transducer-heat sink (NFT-HS), the method including electrically biasing the write pole with respect to a second structure.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Heat assisted magnetic recording (HAMR) heads include a high magnetic moment write pole adjacent to the near field transducer (NFT) and/or heatsink. Typically, the NFT and/or heatsink are made of gold or silver, which are noble metals. The occurrence of having a noble metal adjacent to a high magnetic moment material can lead to galvanic corrosion. Galvanic corrosion is an electrochemical process in which the corrosion of one metal is enhanced due to the presence of another metal when both metals are in electrical contact and immersed in an electrolyte.

Figure 1:
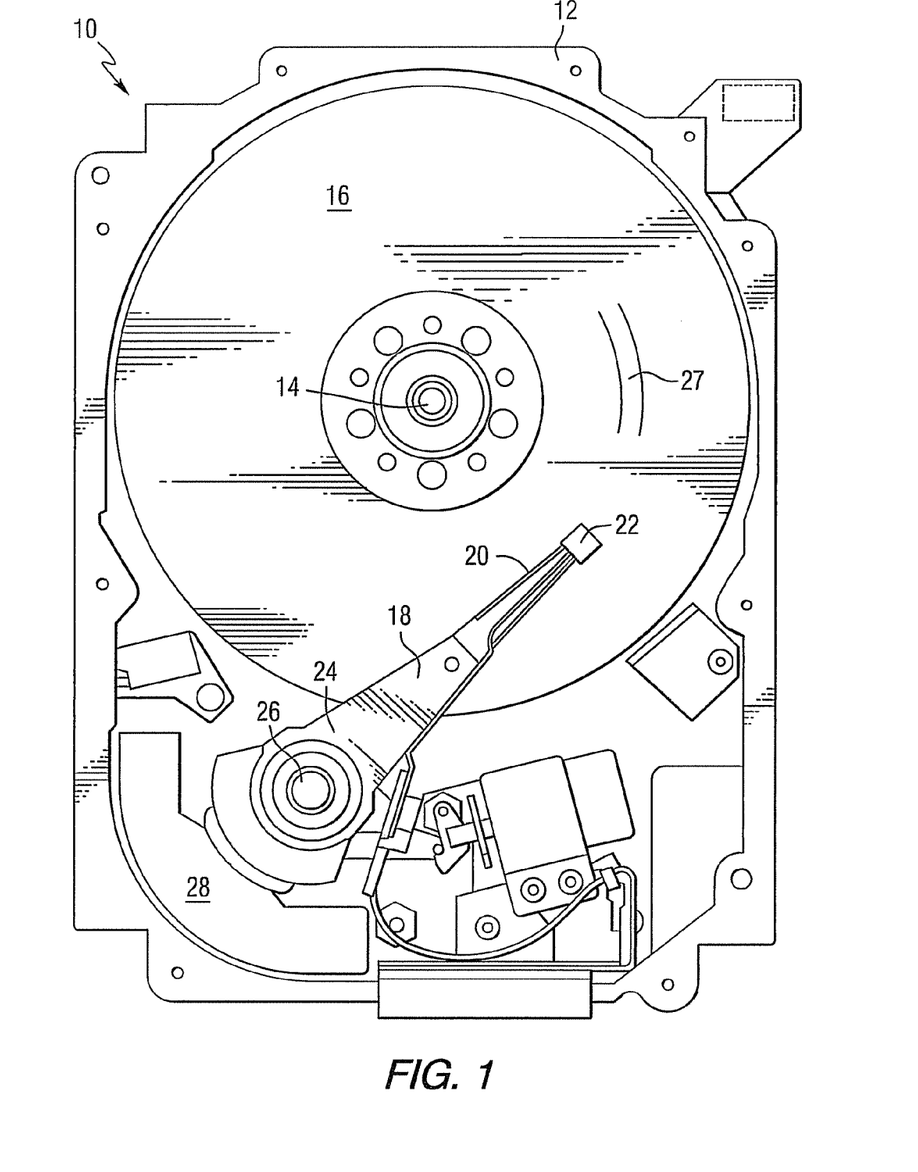
FIG. 1 is a pictorial representation of a data storage device in the form of a disc drive that can include a recording head constructed in accordance with an aspect of this disclosure.

FIG. 1 is a pictorial representation of a data storage device in the form of a disc drive 10 that can utilize recording heads constructed in accordance with various aspects of the disclosure. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light to the storage media for localized heating of the storage media. While FIG. 1 shows a disc drive, the invention can be applied to other devices that include a transducer and a storage media, wherein the storage media is heated to facilitate switching of bits in the storage media.

Figure 2:
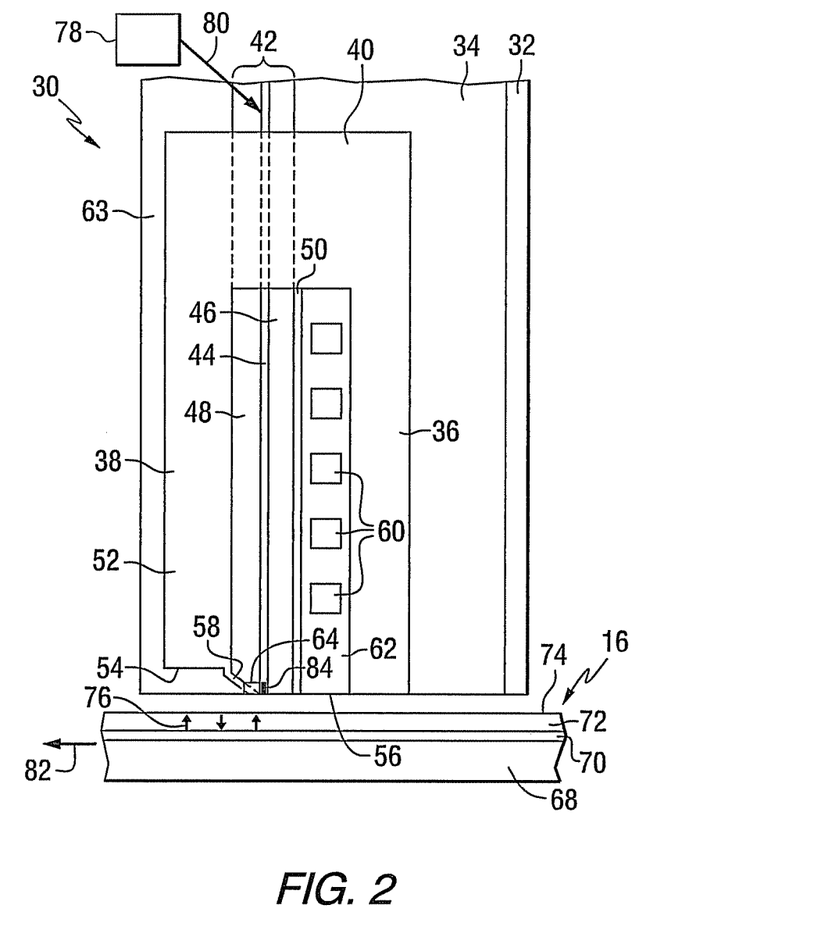
FIG. 2 is a side elevation view of a recording head constructed in accordance with an aspect of the disclosure.

FIG. 2 is a side elevation view of a recording head constructed in accordance with an aspect of the disclosure, and positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material such as, for example, Au.

As illustrated in FIG. 2, the recording head 30 includes a structure for heating the magnetic storage media 16 proximate to where the write pole 58 applies the magnetic write field H to the storage media 16. The media 16 includes a substrate 68, a heat sink layer 70, a magnetic recording layer 72, and a protective layer 74. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near field transducer (NFT) 84 is positioned in or adjacent to the waveguide and at or near the air bearing surface. The heat sink material may be chosen such that it does not interfere with the resonance of the NFT. The NFT can be any one of various types of NFTs, including, for example a nanorod type NFT, or a lollypop type NFT.

Although the example of FIG. 2 shows only one particular example of a particular design of perpendicular magnetic recording head and a perpendicular magnetic storage media, it will be appreciated that the disclosure may also be used in conjunction with any other types of HAMR designs.

Disclosed herein are methods of reducing galvanic corrosion of a HAMR head, and devices that include HAMR heads that may be less susceptible to galvanic corrosion than previously utilized HAMR heads. Methods and devices disclosed herein all electrically bias the write pole with respect to another structure. In some embodiments, the write pole can be biased with respect to the NFT-HS. In some embodiments, the write pole can be biased with respect to an external structure. In this context, an external structure refers to one that is external to the write pole—NFT-HS circuit that is the cause of the galvanic corrosion. In some embodiments, the external structure can be a dedicated structure or an existing structure.

Figure 3:
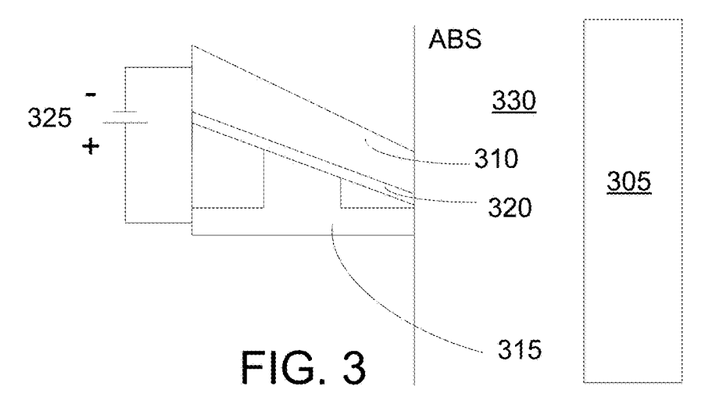
FIG. 3 is a cross section of a schematic of a disclosed device including an electrical isolation layer.

FIG. 3 shows a disclosed apparatus where the write pole is biased with respect to the NFT-HS. Such an apparatus includes a write pole 310, a near field transducer-heat sink (NFT-HS) 315, an electrical isolation layer 320, and a power source 325. Generally, the electrical isolation layer 320 is positioned between the write pole 310 and the NFT-HS 315. The write pole 310 can be similar to that described above with respect to FIG. 2.

The NFT-HS 315 can be a single structure that functions as both a near field transducer and a heat sink or it can be a multi-part structure which as a whole functions as a near field transducer and a heat sink for heat produced by the near field transducer. In some embodiments, the NFT-HS can be a peg/disc type of NFT, which can also be referred to as a lollipop structure, a nanorod type of NFT which can also be referred to as a gap type of NFT, or a funnel-type NFT for example. The near field transducer function of the NFT-HS acts to condense incoming light rays to a location on the magnetic media disc 305, while the heat sink function of the NFT-HS functions to funnel heat, which is generated by the NFT function, away from the NFT structure. The NFT-HS 315 can be described as having an air bearing surface or being at the air bearing surface (ABS) of the device. The ABS is adjacent the magnetic media disc 305. Positioned between the ABS of the device and the magnetic media disc 305 is a gap that can be described as containing some type of electrolyte material 330.

The NFT-HS 315 can be made of, or include a noble metal. Exemplary noble metals can include, for example, gold (Au), silver (Ag), platinum (Pt), palladium (Pd), rhodium (Rh), or alloys thereof. In some embodiments, the NFT-HS 315 can be made of, or include gold (Au), silver (Ag), or alloys thereof.

In previously disclosed devices (those that don't include an electrical isolation layer 320), the write pole 310 and the NFT-HS had electrical contact. Also present was the electrolyte material 330. The electrolyte material 330 can be formed when the lubricant material (present on the magnetic media disc 305) is broken down by high temperatures, exposure to light, or combinations thereof. This breakdown forms an acidic version of the lubricant molecules. The protective layer that exists on the ABS of the device can also corrode and contribute to the electrolyte material 330. Because the write pole 310 is generally made of a high magnetic moment material, the NFT-HS is made of a noble metal, and the electrolyte material 330 is present, galvanic corrosion could occur.

Galvanic corrosion is an electrochemical process in which the corrosion of one metal is enhanced due to the presence of another metal when both of the metals are in electrical contact and are immersed in an electrolyte. Galvanic corrosion causes breakdown of the write pole, causing the HAMR head to fail. Failure due to galvanic corrosion is a relatively prominent failure mode in HAMR heads. Devices disclosed herein minimize or eliminate galvanic corrosion through the addition of the electrical isolation layer, the power source, or combinations thereof.

The electrical isolation layer 320 is generally positioned between the write pole 310 and the NFT-HS 315. The electrical isolation layer 320 functions to electrically isolate the write pole 310 from the NFT-HS 315. The electrical isolation layer 320 can be made of any material that can provide some level of electrical isolation between the write pole 310 and the NFT-HS 315. The level of electrical resistivity that the material of electrical isolation layer 320 must have can be dependent on, amongst other things, the voltage bias between the write pole 310 and the NFT-HS 315. For example, less electrically resistive materials can be utilized in electrical isolation layer 320 if a higher voltage bias is applied across the NFT-HS 315 and the write pole 310. Alternatively, more electrically resistive materials would be necessary in electrical isolation layer 320 if a lower voltage bias were applied across the NFT-HS 315 and the write pole 310. In some embodiments, the material of the electrical isolation layer 320 can have electrical resistivity of at least $10^{12}$ Ohm cm. In some embodiments, the material of the electrical isolation layer 320 can have electrical resistivity of at least $10^{13}$ Ohm cm.

In some embodiments, electrical isolation layer 320 can include electrically resistive (or insulating) materials, such as $Al_2O_3$, $SiO_2$, BeO, MgO, $HfO_2$, $ZrO_2$, $Si_3N_4$, AlN, BN, diamond, or combinations thereof. The thermal conductivity of the material making up the electrical isolation layer 320 can also be considered when choosing a material for the electrical isolation layer 320. In some embodiments, materials with relatively high thermal conductivity can be utilized. Some embodiments that include materials with relatively high thermal conductivity can provide more effective cooling of the NFT with minimal fabrication complexity, for example. If the complexity of additional structures is not a concern, then a diffuser (discussed below) can be added to the device and materials with thermal conductivities as low as 1 W/m-K could be utilized. In some embodiments where it is not desired to add a diffuser, then materials with thermal conductivities of at least 20 W/m-K could be utilized. In embodiments, where thermal conductivity of the material is desired to be maximized, the electrical isolation layer 320 can include materials such as MgO, BeO, AlN, diamond, or combinations thereof.

The electrical isolation layer 320 can span the entire area of contact between the NFT-HS 315 and the write pole 310. The thickness (parallel to the ABS) of the electrical isolation layer 320 can vary. In some embodiments, it can be advantageous to keep the thickness of the electrical isolation layer 320 as thin as possible in order to increase the NFT to pole spacing as little as possible. However, thicker electrical isolation layers could have decreased heat transfer away from the NFT-HS to the write pole because the heat transport is dependent on the area of the material. In some embodiments, the electrical isolation layer 320 can have a thickness from 5 nm to 50 nm. In some embodiments, the electrical isolation layer 320 can have a thickness from 5 nm to 10 nm. The thickness of the electrical isolation layer 320 may be practically limited by constraints on physical space within the device, processing considerations, or combinations thereof.

Disclosed devices also include a power source 325. The power source is electrically connected to the write pole 310 and the NFT-HS 315 and functions to electrically bias the write pole with respect to the NFT-HS. The power source 325 can be a dedicated power source (one whose only function is to bias the write pole and the NFT-HS) or it can be a shared power source (one that provides power for some other function). In some embodiments where the power source is a dedicated power source, it can be a dedicated source on preamps that control the head (of which disclosed devices can be a part). In some embodiments, the power source can be a shared power source, and more specifically can be one where voltage has been scavenged from existing voltage sources. Exemplary existing voltage sources from which power may be scavenged can include, for example writer common-mode voltage or the laser driver.

As discussed above, the power source functions to bias the write pole and the NFT-HS. The amount of bias necessary can be dependent on, the electrical resistivity of the electrical isolation layer 320, the materials of the write pole 310 and the NFT-HS 315, other things not mentioned herein, and combinations thereof. In some embodiments, application of a voltage that is not greater than 0.7 V can be utilized. In some embodiments, application of a voltage that is not greater than 0.5 V can be utilized. It is thought that such voltages applied across the NFT-HS and write pole will not cause electrical discharge at the ABS. Electrical discharge is determined by the maximum magnitude of voltage between the head and the disk below. For effecting galvanic corrosion, on the other hand, it is the potential between the write pole and the anode that matters. Thus, risk of electrical discharge to the disk can be lowered, while maintaining desired galvanic biasing, by making the write pole negative potential with respect to the disk and making the anode positive potential with respect to the disk.

In disclosed devices, the electrical isolation layer 320 along with the voltage bias across the NFT-HS and write pole function to minimize or even eliminate galvanic corrosion because of the impressed flow of electrons into the write pole stifling the corroding reactions occurring near the ABS when disclosed devices are in use.

In previously utilized devices, without an electrical isolation layer, heat generated by the NFT during use would have dissipated from the NFT-HS into the write pole. Addition of the electrical isolation layer can detrimentally affect the travel of heat from the NFT-HS to the write pole. Modeling has shown that by thermally disconnecting the NFT-HS from the write pole, a 55% increase (from 130° K to 230° K) in temperature can occur at the peg (in a lollypop type NFT).

Figure 4A:
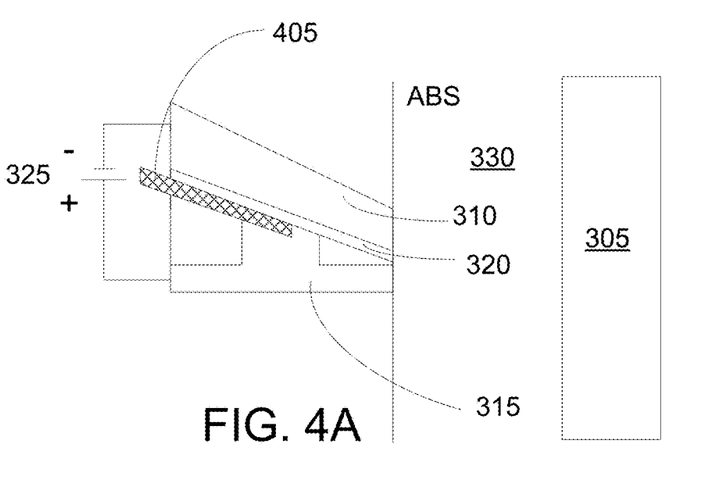
FIGS. 4A and 4B are a cross section (FIG. 4A) and a plan view (FIG. 4B) of a disclosed device that includes an optional diffuser.
Figure 4B:
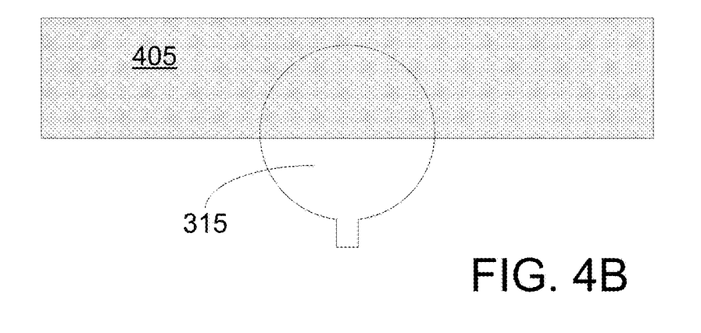

Therefore, in some embodiments, disclosed devices can include a structure or structures to aid in removing heat from the NFT-HS. FIG. 4A depicts an embodiment of a device that includes such a structure. The device of FIG. 4A includes a diffuser 405. The diffuser 405 is in contact with the NFT-HS 315, and more specifically the diffuser 405 is in contact with the heat sink portion of the NFT-HS 315. In embodiments, without an electrical isolation layer 320, nearly all of the heat generated in the NFT portion of the NFT-HS is conducted to the write pole on its way to heatsinks (not pictured herein) in other portions of the device. The addition of the electrical isolation layer 320 degrades the conduction of that heat away from the NFT-HS. The diffuser 405 functions to provide an alternative path for conduction of heat away from the NFT-HS. FIG. 4B shows a plan view of the diffuser 405 and the NFT-HS 315. As seen from this view, the diffuser 405 can have dimensions that are much more extensive than the NFT-HS 315. The regions that extend far beyond the NFT-HS can be useful to aid in spreading heat laterally to aid in the dissipation of such heat.

In some embodiments, the diffuser 405 can be made of any material that has relatively high thermal conductivity properties. Exemplary materials can include, for example gold (Au), silver (Ag), copper (Cu), rhodium (Rh), aluminum (Al), ruthenium (Ru), or combinations thereof. The particular dimensions, thickness and materials can be chosen, based at least in part, on the dimensions and materials of other structures within the device (for example material and thickness of the electrical isolation layer). In some embodiments, the diffuser can be deposited at the same time as the heat sink portion of the NFT-HS.

Modeling has shown that the addition of the diffuser can make the thermal situation very similar to that of the NFT-HS before it was thermally un-connected from the write pole. For example, modeling has shown that the addition of a diffuser shows a temperature rise per incident laser power of 22.3° K/mW versus 21.° K/mW for a NFT-HS without an electrical isolation layer. This was modeling was done on a lollipop-style NFT in which the back half (furthest from the ABS) of the top layer of the heatsink, constructed of Au, was extended cross-track to about 2 um. The dimension, perpendicular to the ABS, of the top layer of the heatsink was also extended to approximately 1 um. This substantial increases the area of the heatsink that is presented to the electrically insulating layer. By increasing the area in contact the total thermal power dissipated can be maintained even though the insulator sharply reduces the thermal power conducted per unit area.

In some other disclosed embodiments, the electrical contact between the write pole and the NFT-HS need not be eliminated, and can instead be electrically compensated for or overcome by an appropriate electrical bias. Such embodiments can utilized an external structure (external from the NFT-HS write pole circuit) to electrically bias the write pole. In some embodiments, the external structure can be a dedicated structure or can be an existing structure. Dedicated structures are structures that were formed in order to provide an anode for the write pole and do not have another purpose in the overall structure. Existing structures are structures that were not formed for the purpose of providing an anode for the write pole and have another purpose in the overall structure.

Figure 5A:
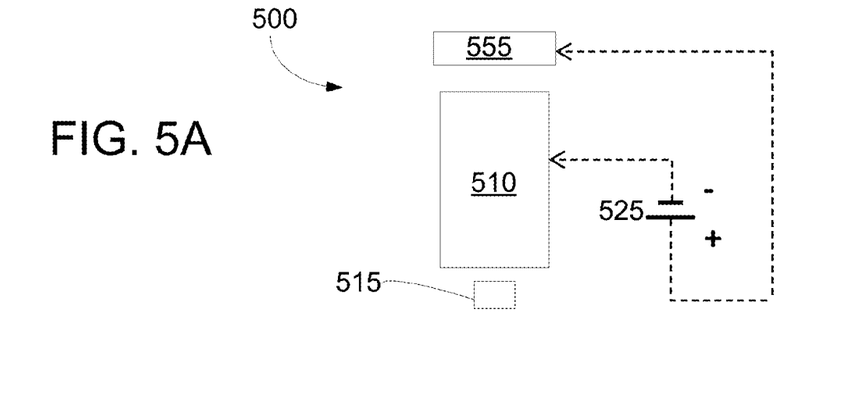
FIGS. 5A, 5B, and 5C are schematic depictions of devices disclosed herein including dedicated anodes.

FIG. 5A shows a schematic of an embodiment of a device that includes a dedicated structure. The device 500 includes a write pole 510, and an adjacent NFT-HS 515. The write pole 510 and the NFT-HS 515 can be electrically connected (via contact not the circuit shown in the figure) or can be electrically isolated. The write pole 510 is electrically biased with a power source 525 to a dedicated anode 555. The dedicated anode 555 can generally be made of a noble metal. In some embodiments, the dedicated anode 555 can be described as being made of a galvanically noble material such as platinum (Pt), gold (Au), silver (Ag), titanium (Ti), rhodium (Rh), ruthenium (Ru), graphite, or combinations thereof. In the depicted embodiment, the dedicated anode 555 is electrically isolated from the write pole 510 but is electrically connected to it via the circuit formed from the write pole 510, the power source 525 and the dedicated anode 555, and the NFT-HS 515 and write pole 510 can be either electrically connected or electrically isolated.

Figure 5B:
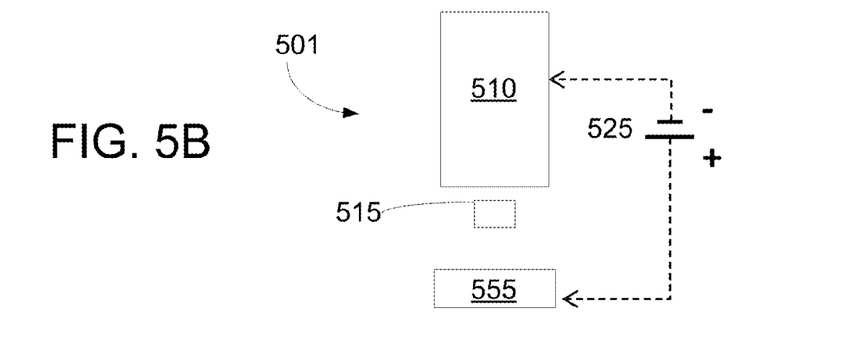

FIG. 5B shows a schematic of an embodiment of a device that includes another dedicated structure. The device 501 includes the same components as the device 500 of FIG. 5A, which are numbered similarly. In the device 501 the dedicated anode is positioned on the opposite side of the NFT-HS 515, whereas in the device 500 (of FIG. 5A), the dedicated anode is positioned on the opposite side of the write pole 510. In the depicted embodiment, the dedicated anode 555 is electrically isolated from the write pole 510 but is electrically connected to it via the circuit formed from the write pole 510, the power source 525 and the dedicated anode 555, and the NFT-HS 515 and write pole 510 can be either electrically connected or electrically isolated.

Figure 5C:
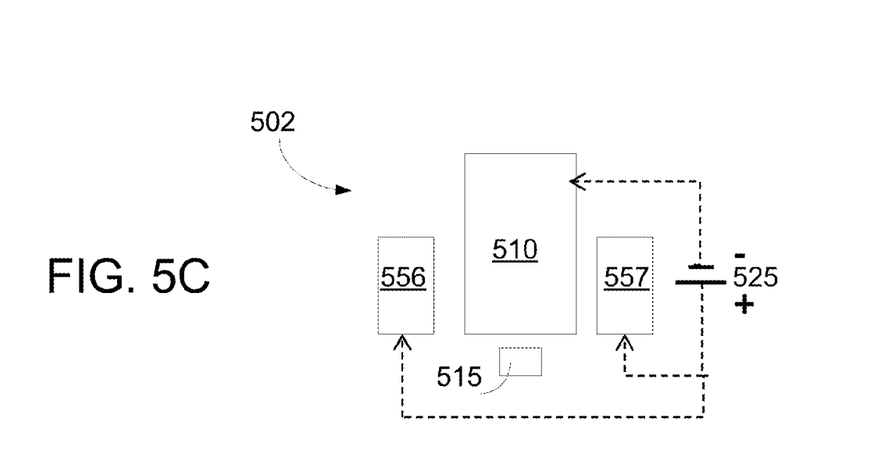

FIG. 5C shows a schematic of an embodiment of a device that includes another dedicated structure. The device 502 includes the same components as the device 500 of FIG. 5A (and device 501 of FIG. 5B) with the exception that instead of a single dedicated anode 555, the device 502 includes a first and second dedicated anode 556 and 557. In the device 502 the dedicated anodes are positioned on opposite sides of the write pole 510. In the depicted embodiment, the first and second dedicated anodes 556 and 557 are electrically isolated from the write pole 510 but are electrically connected to it via the circuit formed from the write pole 510, the power source 525 and the first and second dedicated anodes 556 and 557; and the NFT-HS 515 and write pole 510 can be either electrically connected or electrically isolated. Embodiments that include two dedicated anodes can be beneficial because in order for the dedicated anodes to reduce galvanic corrosion they must share an electrolyte solution with the write pole. Increasing the area of the anodes increases the chance of contacting the electrolyte solution. Another embodiment (not depicted herein) includes an anode ring that is positioned entirely around—but electrical isolated from—the write pole. Such an embodiment would greatly increase the area of the anode.

Figure 6:
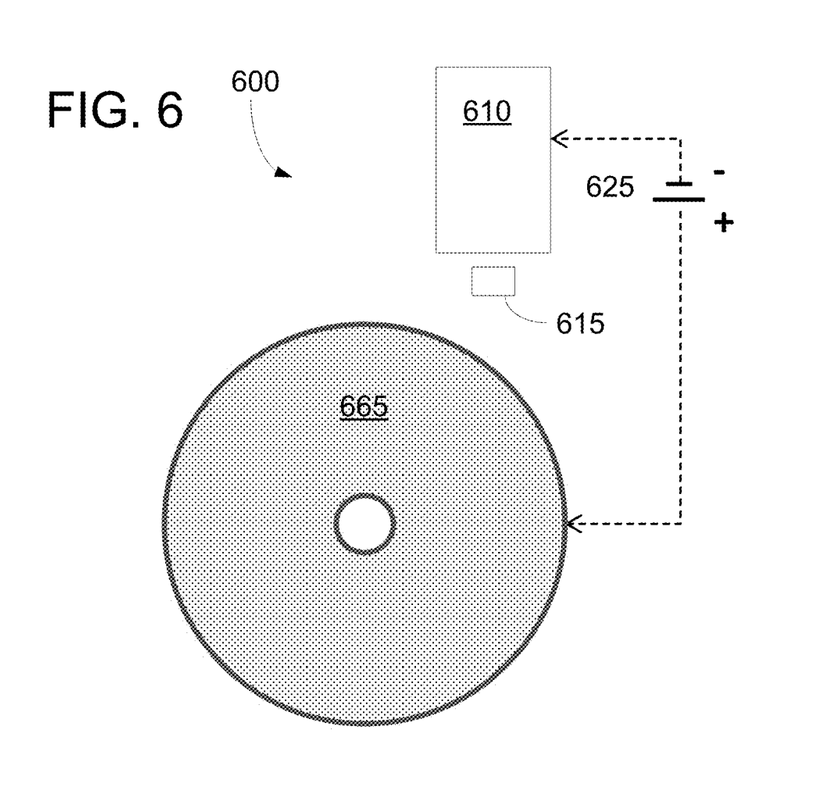
FIG. 6 is a schematic depiction of a device disclosed herein that includes an existing structure as an anode.

FIG. 6 shows a schematic (with orientations and perspectives of various components flipped with respect to others) of an embodiment of a device that includes an existing structure being used to bias the write pole. The device or system 600 includes a write pole 610 and a NFT-HS 615. The write pole 610 and the NFT-HS 615 can be electrically connected (via contact not the circuit shown in the figure) or can be electrically isolated. The write pole 610 is electrically biased with a power source 625 to a magnetic media 665. The magnetic media 665 can be, for example the magnetic storage media 16 exemplified in FIG. 1.

As discussed above, the power source functions to bias the write pole with respect to the external structure (in embodiments such as those depicted in FIGS. 5A, 5B, 5C, and 6. The amount of bias necessary can be dependent on, the materials of the write pole and the NFT-HS, other things not mentioned herein, or combinations thereof. In some embodiments, application of a voltage of at least 0.1 V can be utilized. Lower voltages may be applicable in some embodiments where the write pole is not the typical write pole and the system exists in acidic conditions. In some embodiments, application of a voltage of from 0.1 V to as high as 1.2 V could be utilized. Higher voltages may be applicable in some embodiments where the write pole has a relatively high iron (Fe) content for example.

Various devices including other optional components are also considered disclosed herein.

Methods of reducing galvanic corrosion are also disclosed herein. In some embodiments, such methods can include biasing the write pole of a HAMR head with respect to a second structure. Biasing the write pole of the HAMR head with respect to a second structure can serve to reduce or eliminate galvanic corrosion by overcoming the electrochemical drive that exists in a HAMR head including a write pole adjacent a NFT-HS made of a noble material. In some embodiments, the second structure can include the NFT-HS itself or an external structure (a structure external to the write pole—NFT-HS circuit causing the galvanic corrosion).

Exemplary methods can include, for example, methods of reducing galvanic corrosion of a HAMR head, such as those disclosed above that include an electrical isolation layer positioned between the write pole and the NFT-HS. Such methods can include a step of applying a voltage across the NFT-HS and write pole, wherein the NFT-HS and the write pole are electrically isolated by the electrical isolation layer. The voltage that is applied can be a voltage that is not greater than 0.7 V. In some embodiments, application of a voltage that is not greater than 0.5 V can be utilized. It is thought that such voltages applied across the NFT-HS and write pole will not cause electrical discharge at the ABS.

In some embodiments, such methods can include biasing the write pole with respect to an external structure. Such methods can include or be carried out when the NFT-HS and the write pole are electrically isolated (irrespective of the circuit which biases them). Such methods can also be carried out when the NFT-HS and the write pole are not electrically isolated. Exemplary methods can include, for example, methods of reducing galvanic corrosion of a HAMR head that include a step of applying a voltage across the write pole and the external structure. Such methods can include applying a voltage to a dedicated structure or an existing structure, such as those discussed above. The voltage that is applied can be a voltage from 0.1 V to 1.2 V, for example.

The power for such voltages can be can be a dedicated power source (one whose only function is to bias the write pole and the NFT-HS) or it can be a shared power source (one that provides power for some other function). In some embodiments a dedicated power source can be utilized, for example a dedicated power source on preamps that control the head (of which disclosed devices can be a part). In some embodiments, the power source can be a shared power source, and more specifically can be one where voltage has been scavenged from existing voltage sources. Exemplary existing voltage sources from which power may be scavenged can include, for example writer common-mode voltage or the laser driver.

Thus, embodiments of heat assisted magnetic recording heads are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. An apparatus comprising:
a write pole, the write pole comprising a magnetic material;
a near field transducer-heat sink (NFT-HS), the NFT-HS comprising a noble metal;
a power source configured to electrically bias the write pole with respect to the NFT-HS; and
an electrical isolation layer, the electrical isolation layer positioned between the write pole and the NFT-HS, the electrical isolation layer configured to electrically isolate the write pole from the NFT-HS,
wherein the write pole, the power source and the NFT-HS are part of an electrical circuit.

2. The apparatus according to claim 1, wherein the electrical isolation layer comprises $Al_2O_3$, $SiO_2$, BeO, MgO, $HfO_2$, $ZrO_2$, $Si_3N_4$, AlN, BN, diamond, or combinations thereof.

3. The apparatus according to claim 1, wherein the electrical isolation layer comprises MgO, BeO, AN, diamond, or combinations thereof.

4. The apparatus according to claim 1, wherein the power source provides a voltage that is not greater than about 0.7 V.

5. An apparatus comprising: a write pole, the write pole comprising a magnetic material; a near field transducer-heat sink (NFT-HS), the NFT-HS comprising a noble metal; a power source configured to electrically bias the write pole with respect to a dedicated anode that is electrically unconnected to the write pole; and a diffuser in contact with the NFT-HS, wherein the diffuser comprises gold, silver, copper, rhodium, or combinations thereof.

6. An apparatus comprising:
a write pole, the write pole comprising a magnetic material;
a near field transducer-heat sink (NFT-HS), the NFT-HS comprising a noble metal;
a power source configured to electrically bias the write pole with respect to a dedicated anode that is electrically unconnected to the write pole.

7. The apparatus according to claim 6, wherein the dedicated anode comprises platinum (Pt), gold (Au), silver (Ag), titanium (Ti), rhodium (Rh), ruthenium (Ru), graphite, or combinations thereof.

8. An apparatus comprising:
a write pole, the write pole comprising a magnetic material;
a near field transducer-heat sink (NFT-HS), the NFT-HS comprising a noble metal;
a power source configured to electrically bias the write pole with respect to a magnetic recording media.

9. An apparatus comprising:
a write pole, the write pole comprising a magnetic material;
a near field transducer-heat sink (NFT-HS), the NFT-HS comprising a noble metal; and
a power source configured to electrically bias the write pole with respect to a second structure, wherein the power source provides power to some other portion of the apparatus as well.

10. An apparatus comprising:
a write pole, the write pole comprising a magnetic material;
a near field transducer-heat sink (NFT-HS), the NFT-HS comprising a noble metal;
an electrical isolation layer, the electrical isolation layer positioned between the write pole and the NFT-HS, the electrical isolation layer configured to electrically isolate the write pole from the NFT-HS; and
a power source configured to electrically bias the write pole with respect to the NFT-HS.

11. The apparatus according to claim 10, wherein the electrical isolation layer comprises $Al_2O_3$, $SiO_2$, BeO, MgO, $HfO_2$, $ZrO_2$, $Si_3N_4$, AN, BN, diamond, or combinations thereof.

12. The apparatus according to claim 10 further comprising a diffuser in contact with the NFT-HS, the diffuser comprising gold, silver, copper, rhodium, or combinations thereof.

13. A method of reducing galvanic corrosion of a heat assisted magnetic recording (HAMR) head, the HAMR head comprising a write pole, and a near field transducer-heat sink (NFT-HS), the method comprising:
electrically biasing the write pole with respect to the NFT-HS, wherein the HAMR head further comprises an electrical isolation layer positioned between the write pole and the NFT-HS, and the write pole is biased with a voltage of not greater than about 0.7 V.

14. A method of reducing galvanic corrosion of a heat assisted magnetic recording (HAMR) head, the HAMR head comprising a write pole, and a near field transducer-heat sink (NFT-HS), the method comprising: electrically biasing the write pole with respect to a magnetic recording media; and using the write pole and the NFT-HS.

* * * * *